(12) United States Patent
Helfinstine et al.

(10) Patent No.: US 11,297,108 B2
(45) Date of Patent: Apr. 5, 2022

(54) METHODS AND SYSTEMS FOR STATEFUL NETWORK SECURITY

(71) Applicant: COMCAST CABLE COMMUNICATIONS, LLC, Philadelphia, PA (US)

(72) Inventors: Charles A. Helfinstine, Wynnewood, PA (US); Yiu Lee, Philadelphia, PA (US); Bin Wen, Philadelphia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/235,763

(22) Filed: Dec. 28, 2018

(65) Prior Publication Data

US 2020/0213358 A1 Jul. 2, 2020

(51) Int. Cl.
| | |
|---|---|
| *H04L 29/06* | (2006.01) |
| *H04L 9/32* | (2006.01) |
| *H04L 29/08* | (2006.01) |
| *G06F 21/60* | (2013.01) |
| *H04L 67/14* | (2022.01) |

(52) U.S. Cl.
CPC .......... *H04L 63/20* (2013.01); *G06F 21/604* (2013.01); *H04L 9/3236* (2013.01); *H04L 63/101* (2013.01); *H04L 63/18* (2013.01); *H04L 67/14* (2013.01); *G06F 2221/2141* (2013.01)

(58) Field of Classification Search
CPC ..... H04L 63/20; H04L 9/3236; H04L 63/101; H04L 63/18; H04L 67/14; G06F 21/604; G06F 2221/2141

USPC .......................................................... 709/229
See application file for complete search history.

(56) References Cited

U.S. PATENT DOCUMENTS

| | | | |
|---|---|---|---|
| 7,106,756 B1 * | 9/2006 | Donovan | H04L 47/15 370/395.21 |
| 8,352,998 B1 * | 1/2013 | Kougiouris | H04L 63/20 726/1 |
| 8,732,796 B1 | 5/2014 | Atieh et al. | |
| 9,258,742 B1 * | 2/2016 | Pianigiani | H04L 45/38 |
| 10,990,689 B1 * | 4/2021 | Reiner | G06F 21/6218 |
| 2007/0094712 A1 * | 4/2007 | Gibbs | H04L 47/10 726/3 |

(Continued)

OTHER PUBLICATIONS

P. Marques, RFC 5575: Dissemination of Flow Specification Rules, Aug. 2009 (Year: 2009).*

*Primary Examiner* — Schquita D Goodwin
(74) *Attorney, Agent, or Firm* — Ballard Spahr LLP

(57) ABSTRACT

A destination host on a first network may attempt to initiate a communication session with a source host on a second network. The attempt may be intercepted by a first policy enforcement point, which may forward a message to the source host associated with the communication session. The source host may send an acknowledgment to the destination host via the first policy enforcement point. A policy decision point may determine that the communication session is permissible. The policy decision point may send a response to the first policy enforcement point and a second policy enforcement point. The response may indicate an approval of the communication session. The source host may respond to the destination host through either a first connection path and the first policy enforcement point or a second connection and the second policy enforcement point.

20 Claims, 11 Drawing Sheets

(56) References Cited

U.S. PATENT DOCUMENTS

| | | | |
|---|---|---|---|
| 2012/0005718 A1* | 1/2012 | Xiao | H04L 63/20 |
| | | | 726/1 |
| 2014/0140213 A1* | 5/2014 | Raleigh | H04L 65/601 |
| | | | 370/235 |
| 2014/0372591 A1* | 12/2014 | Payette | H04L 65/605 |
| | | | 709/223 |
| 2015/0089566 A1* | 3/2015 | Chesla | H04L 63/101 |
| | | | 726/1 |
| 2015/0249593 A1* | 9/2015 | Alvarez | H04L 41/0803 |
| | | | 370/241 |
| 2015/0341444 A1* | 11/2015 | Pardo-Blazquez | ............ |
| | | | H04L 63/0245 |
| | | | 709/224 |
| 2016/0205135 A1* | 7/2016 | Nguyen | H04L 63/1458 |
| | | | 726/23 |
| 2016/0314296 A1* | 10/2016 | Attfield | G06F 21/53 |
| 2017/0063931 A1* | 3/2017 | Seed | G06Q 20/40 |
| 2017/0272470 A1* | 9/2017 | Gundamaraju | H04L 12/1407 |
| 2017/0331791 A1 | 11/2017 | Wardell et al. | |
| 2018/0013763 A1 | 1/2018 | Wilson et al. | |
| 2018/0054459 A1 | 2/2018 | Jalan et al. | |
| 2018/0081983 A1 | 3/2018 | Carru et al. | |
| 2019/0258811 A1* | 8/2019 | Ferraiolo | G06F 16/2455 |
| 2020/0195649 A1* | 6/2020 | He | G06Q 10/0631 |

\* cited by examiner

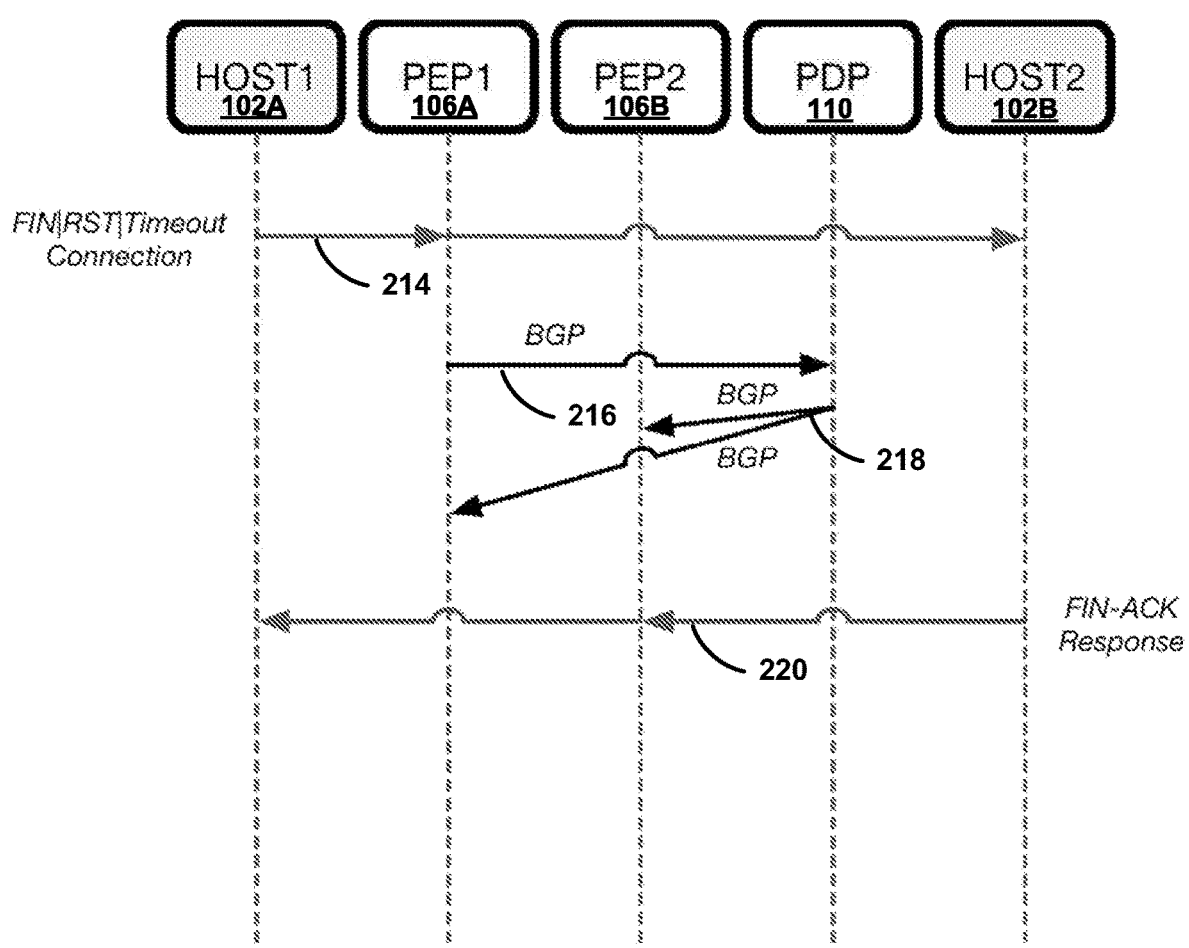

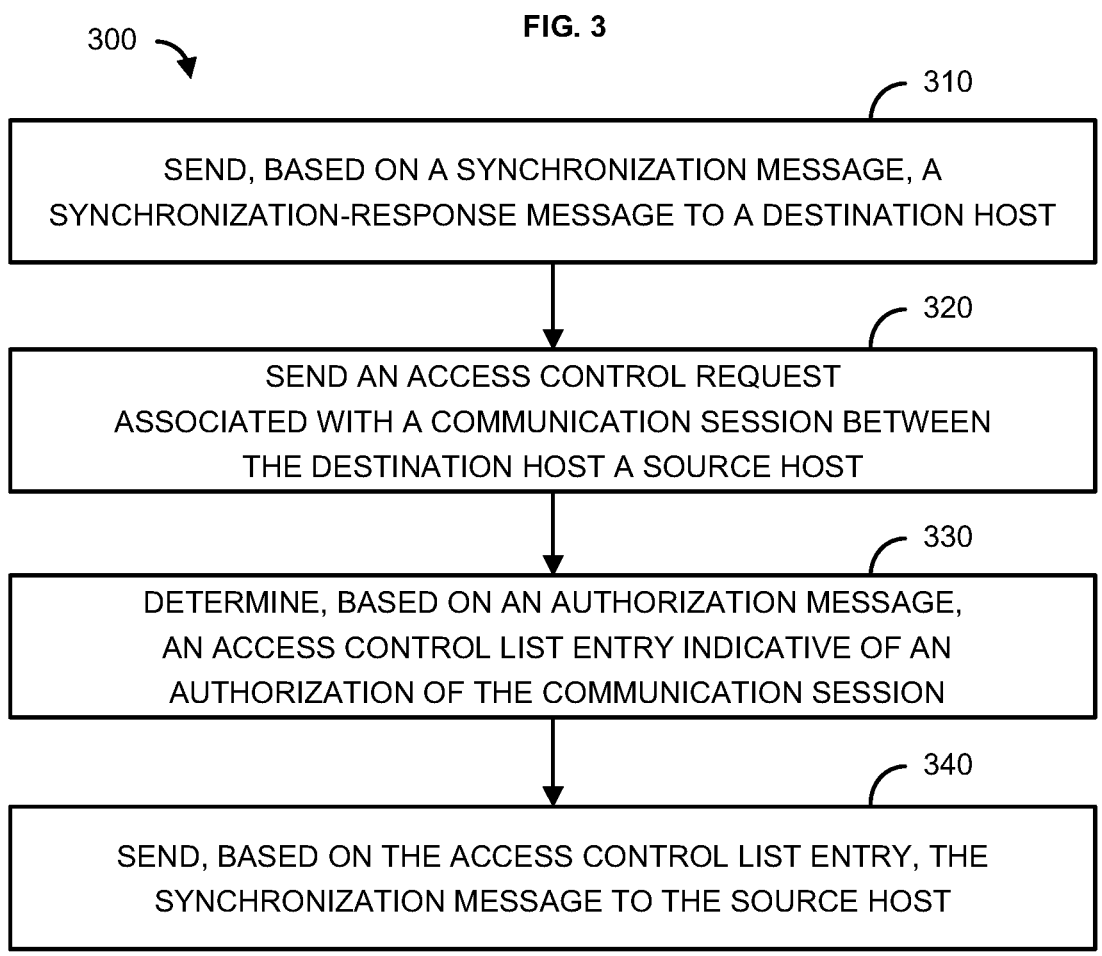

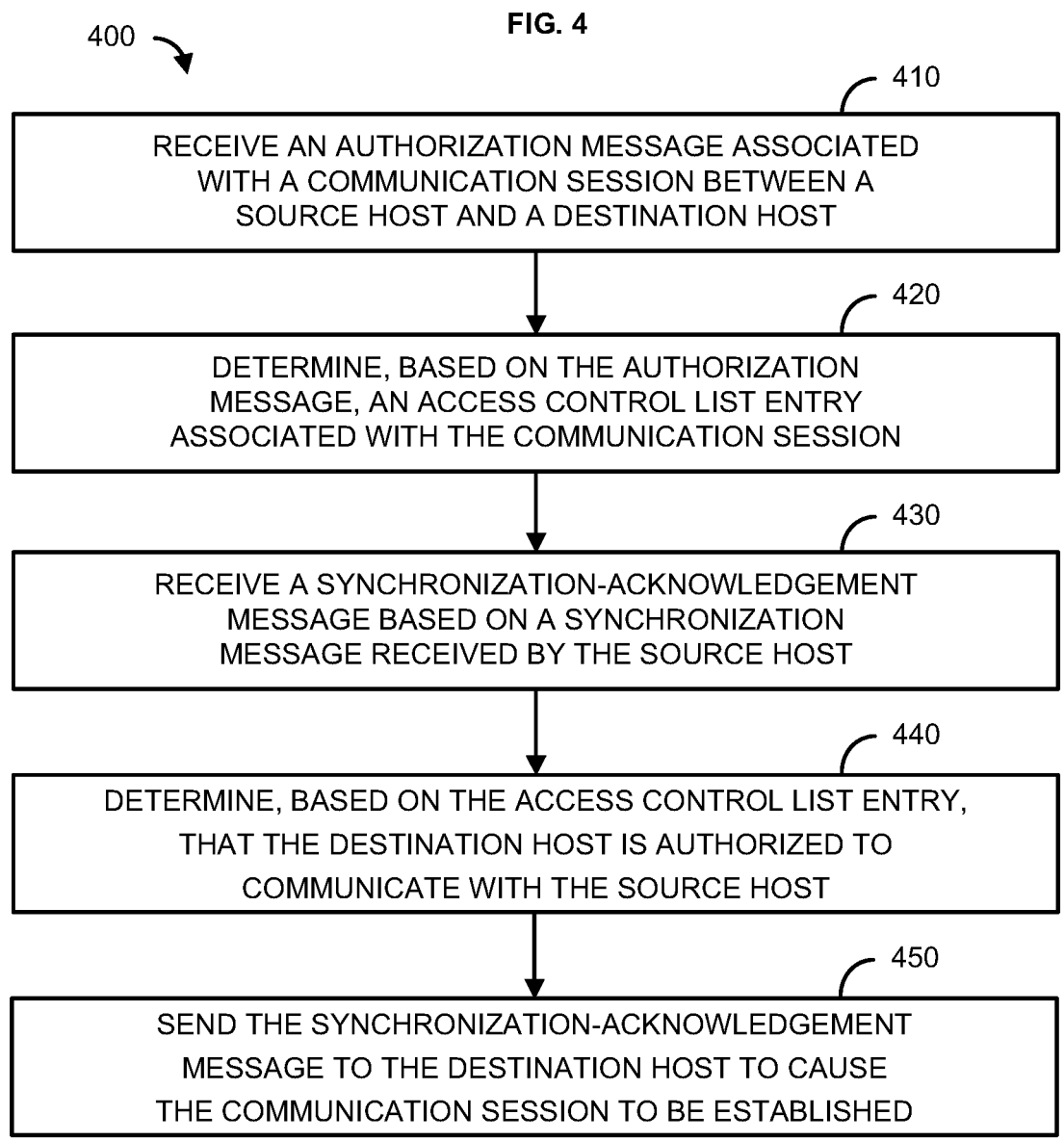

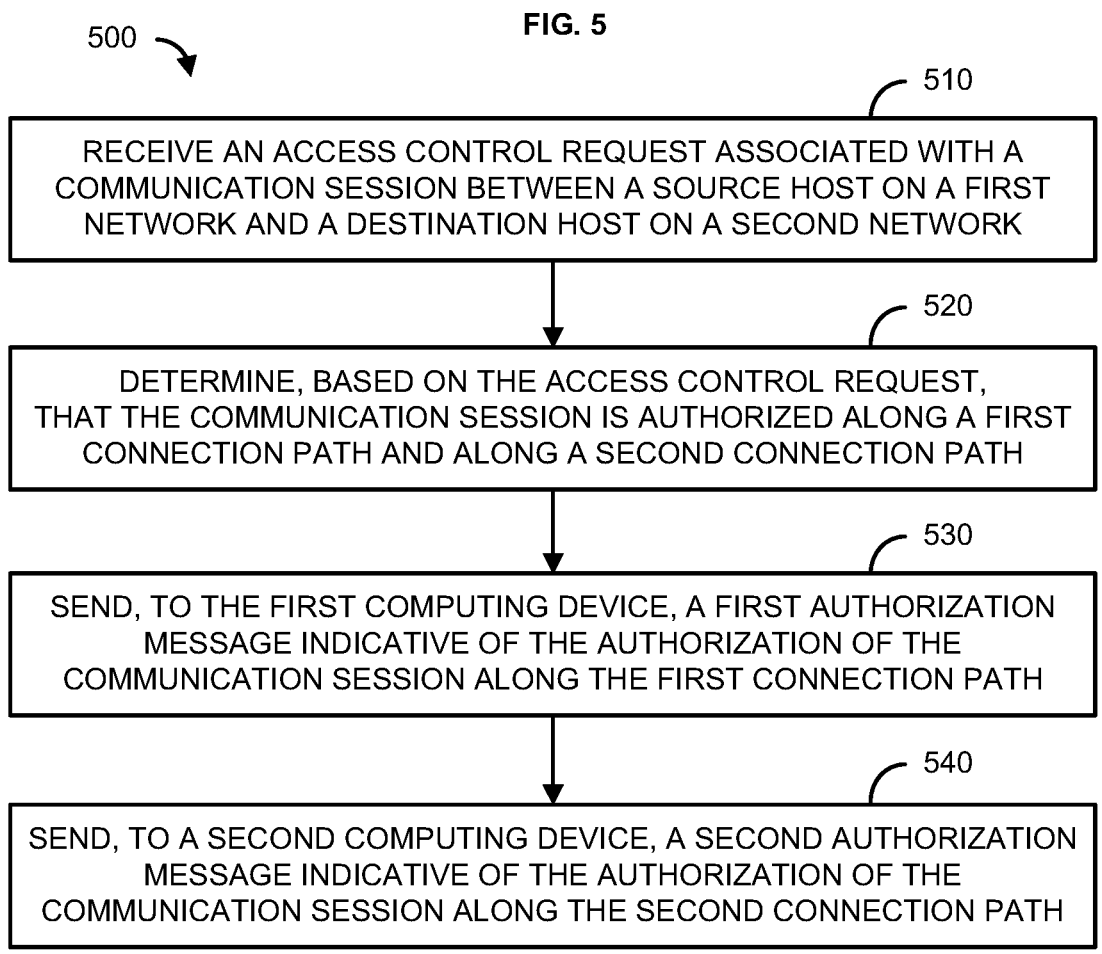

METHODS AND SYSTEMS FOR STATEFUL NETWORK SECURITY

BACKGROUND

Securely sending and receiving content across multiple networks requires ensuring that compliance is met with respect to access control policies for each network. Policy enforcement points may be used by networks to implement access control policies such that only approved connection paths between a source host and a destination host may be used for sending and receiving content between the hosts. Implementing access control policies with stateful architecture is often costly and burdensome from a standpoint of scalability and reliability. Though stateless architectures are less burdensome, they may not be compliant with access control policies for cloud-based and other types of networks. These and other considerations are addressed by the approaches set forth herein.

SUMMARY

It is to be understood that both the following general description and the following detailed description are exemplary and explanatory only and are not restrictive. Provided are methods and systems for stateful network security. A destination host on a first network seeking to receive content from a source host on a second network may attempt to initiate a communication session with the source host by sending a synchronization message to the source host. A computing device may determine that the communication session between the source host and the destination host is permissible along a first connection path on a first network and/or along a second connection path on a second network. In this way, the source host may communicate with the destination host using either the first connection path on the first network or the second connection path on the second network. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2B shows a flowchart of an example network communications flow;
FIG. 3 shows a flowchart of an example method;
FIG. 4 shows a flowchart of an example method;
FIG. 5 shows a flowchart of an example method.

DETAILED DESCRIPTION

Figure 1A:
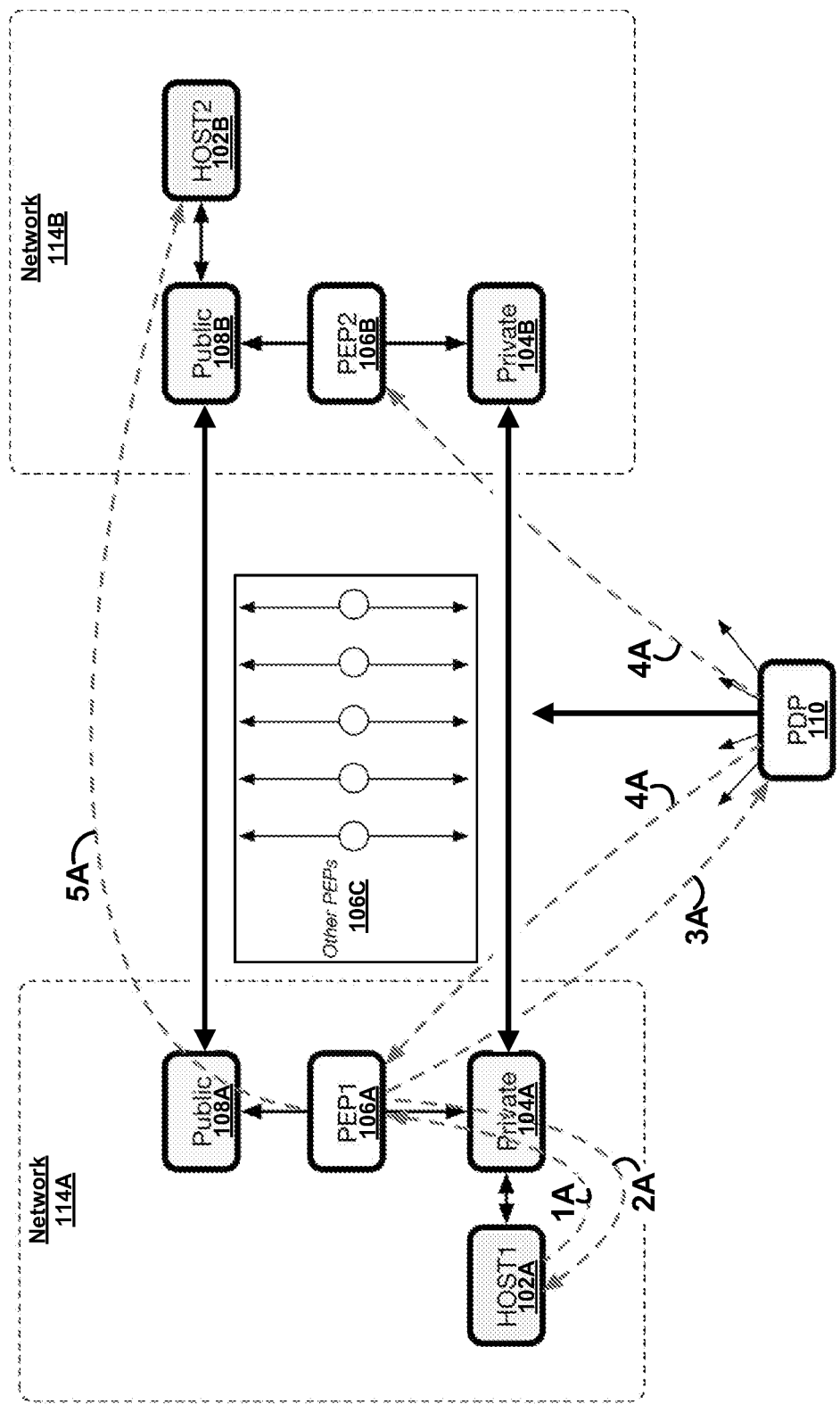
FIG. 1A shows a flowchart of an example network communications flow.

Before the methods, systems, and apparatuses are described, it is to be understood that the methods, systems, and apparatuses are not limited to specific methods, specific components, or to particular implementations. It is also to be understood that the terminology used herein is not intended to be limiting. As used in the descriptions herein and the appended claims, the singular forms "a," "an," and "the" include plural referents unless the context clearly dictates otherwise. Ranges may be expressed herein as from "about" one particular value, and/or to "about" another particular value. When such a range is expressed, another range includes from the one particular value and/or to the other particular value. Similarly, when values are expressed as approximations, by use of the antecedent "about," it will be understood that the particular value forms another value or range. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not. Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Described herein are components that may be used by the described methods, systems, and apparatuses. These and other components are described herein, and it is understood that when combinations, subsets, interactions, groups, etc. of these components are described that while specific reference of each various individual and collective combinations and permutations of these may not be explicitly described, each is specifically contemplated and described herein, for all methods, systems, and apparatuses. This applies to all parts of this application including, but not limited to, steps in described methods. Thus, if there are a variety of additional steps that may be performed, it is understood that each of these additional steps may be performed with any combination or permutation of the described methods.

The methods, systems, and apparatuses described herein may be understood more readily by reference to the following detailed description and to the Figures and their previous and following descriptions. The methods, systems, and apparatuses may be entirely hardware, entirely software, or a combination of software and hardware. The methods, systems, and apparatuses described herein may take the form of a computer program product on a computer-readable storage medium having computer-readable program instructions (e.g., computer software) embodied in the storage medium. The methods, systems, and apparatuses described herein may take the form of web-implemented computer software. Any suitable computer-readable storage medium may be utilized including hard disks, CD-ROMs, optical storage devices, or magnetic storage devices.

The methods, systems, and apparatuses are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. Each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Content items (which may also be referred to as "content," "content data," "content information," "content asset," "multimedia asset data file," or simply "data" or "information") may be any information or data that may be licensed to one or more individuals (or other entities, such as business or group) and may be electronic representations of video, audio, text and/or graphics, which may be but are not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future.

The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats. This detailed description may refer to a given entity performing some action. It should be understood that this language may in some cases mean that a system (e.g., a computer) owned and/or controlled by the given entity is actually performing the action.

A stateful access control regime is described that may securely send and receive content across one or more networks. The one or more networks may have an asymmetric network topology whereby multiple connection paths may exist between a source host on a first network and a destination host on a second network. Each network may have a policy enforcement point (PEP) that may be used to implement access control policies such that only approved connection paths between the source host and the destination host may be used for sending and receiving content between the hosts. A policy decision point (PDP) in communication with one or more PEPs may determine whether a requested communication session between the source host and the destination host is permissible.

The PDP, as a controller of each PEP, thus maintains stateful connection information associated with each PEP. The PDP and the PEPs, as a group, thus may implement a stateful network security architecture, which may be horizontally scalable. If additional PEPs (e.g., additional connection paths) are added, the PDP need only communicate with the existing PEPs and the additional PEPs. Adding more PEPs to the group may not require any individual PEP to perform any additional action (e.g., the PDP maintains aggregated state information for each PEP). The PDP is only minimally burdened when additional PEPs are added, since the forward and reverse flowspecs generated for each PEP may be nearly identical, with the exception of identifying information included in each flowspec for the corresponding PEP (e.g., an identifier of a PEP). The presently described stateful network security architecture therefore represents an improvement to existing stateful network security configurations, which may require all traffic to and from hosts to pass through a single PEP (e.g., a single point of failure/bottleneck).

FIGS. 1A-1D show configurations and use cases for the stateful network security architecture. As seen in FIG. 1A, two separate networks 114A and 114B may communicate with one another by a public rail 108A,108B (e.g., a connection path provided by an internet service provider) in communication with a policy enforcement point (PEP) 106A,106B and a private rail 104A,104B (e.g., a private home/office network, router, etc.). To generate a communication session (e.g., a transmission control protocol (TCP session)) between network 114A and network 114B, a three-way handshake may be initiated by a destination host 102A sending a synchronization message to a source host 102B, as shown by the connection flow 1A. Messages sent during the three-way handshake may identify one or more of the destination host or the source host by an internet protocol (IP) address, a MAC (Media Access Control) address, an IMEI (International Mobile Equipment Identity), an SSID (Service Set Identifier), a source port, or any other identifier.

The synchronization message may be associated with a request to initiate the communication session between the source host 102B and the destination host 102A. The synchronization message may be intercepted by a first PEP 106A on the network 114A. At the connection flow 2A, the first PEP 106A may respond to the synchronization message by sending a synchronization-response message (e.g., a synchronization cookie, etc.) to the destination host 102A. The destination host 102A may in turn send an acknowledgment (ACK) to the first PEP 106A. At the connection flow 3A, the first PEP 106A may send an inquiry message to the PDP 110 identifying the source host 102B, the destination host 102A, and the communication session (e.g., based on the synchronization message received from the destination host 102A). The PDP 110 may determine that the communication session between the source host 102B and the destination host 102A is permissible. The determination by the PDP 110 may be based on the access control policies for network 114A and/or network 114B. The PDP 110 may determine that the communication session may use one or more connection paths. A first connection path may pass through the first PEP 106A. A second connection path may pass through a second PEP 106B on network 114B. At the connection flow 4A, the PDP 110 may send a response to the first PEP 106A indicative of an approval of the communication session between the source host 102B and the destination host 102A along the first connection path. The PDP 110 may send a message to the second PEP 106B indicative of an approval of the communication session between the source host 102B and the destination host 102A along the second connection path. The PDP 110 may send a message to any additional PEPs 106C indicative of an approval of communications between the source host 102B and the destination host 102A along a connection path corresponding to each of the additional PEPs 106C.

At the connection flow 4A, the first PEP 106A may receive the response from the PDP 110 and generate an access control list entry associated with the communication session along the first connection path. The access control list entry may identify the source host 102B and the destination host 102A and may indicate that the communication session along the first connection path is permissible. At the connection flow 5A, the first PEP 106A may forward the synchronization message to the source host 102B (e.g., the first PEP 106A acts as a proxy for the destination host 102A). At or near the moment the first PEP 106A forwards the synchronization message to the source host 102B, the second PEP 106B may receive the message from the PDP 110 indicating the approval of the communication session between the source host 102B and the destination host 102A along the second connection path. The second PEP 106B may generate an access control list entry associated with the communication session along the second connection path. The access control list entry may identify the source host 102B and the destination host 102A and may indicate that the communication session along the second connection path is permissible.

The initial synchronization message sent from the destination host 102A and intercepted by the first PEP 106A at the connection flow 1A may include a sequence number. The SYN response sent from the first PEP 106A to the destination host 102A at the connection flow 2A may include the sequence number incremented by a certain value (e.g., by 1). The acknowledgement sent by the destination host 102A to the first PEP 106A may include the incremented sequence number. The source host 102B may respond (e.g., based on the synchronization message received from the first PEP 106A) with a synchronization-acknowledgement message (e.g., SYN-ACK) having a unique sequence number. The synchronization-acknowledgement message may be received by the destination host 102A via the first connection path (e.g., the synchronization-acknowledgement message passes through the first PEP 106A based on local network policies and/or load-balancing policies for the first network) or via the second connection path (e.g., the synchronization-acknowledgement message passes through the second PEP 106B based on local network policies and/or load-balancing policies for the second network). In response to receiving the synchronization-acknowledgement message, the destination host 102A may send an acknowledgement message having a sequence number that is associated with the sequence number of the initial synchronization message (e.g., the sequence number of synchronization-acknowledgement message is equal to the sequence number of the initial synchronization message incremented by a certain value). In this way, the messages sent between the source host 102B and the destination host 102A may be checked to determine that they each correspond to the communication session.

The synchronization-response message sent from the first PEP 106A to the destination host 102A at the connection flow 1A may be a synchronization cookie. The synchronization cookie may have a sequence number associated with the source host 102B, an indication of an acknowledgement of the initial synchronization message, as well as other data and/or attributes. When the source host 102B receives the synchronization message from the first PEP 106A at the connection flow 5A, the synchronization-acknowledgement message the source host 102B sends to the first PEP 106A in reply may have the sequence number associated with the destination host 102A, an indication of an acknowledgement of the synchronization message, as well as other data and/or attributes. By using a synchronization cookie, the destination host 102A and/or the first PEP 106A may determine that communications received from the source host 102B are legitimate (e.g., the communications are originating from the source host 102B rather than a malicious host posing as the source host 102B).

Using a synchronization cookie may allow for a reduction in latency associated with initiating the communication session. Specifically, this may be accomplished by the PDP 110 sending a message indicating the approval of the communication session to the first PEP 106A and the second PEP 106B at or near the same time. The first PEP 106A may receive the message indicating the approval of the communication session before the second PEP 106B receives the message. In that case, the first PEP 106A may forward the synchronization message to the source host 102B, during which time the second PEP 106B may receive the message from the PDP 110 indicating the approval of the communication session. The second PEP 106B may generate the access control list entry identifying the source host 102B, the destination host 102A, and the second connection path before the source host 102B responds to the destination host 102A with the synchronization-acknowledgement message. Thus, the synchronization-acknowledgement message may travel along either the first connection path or the second connection path.

Figure 1B:
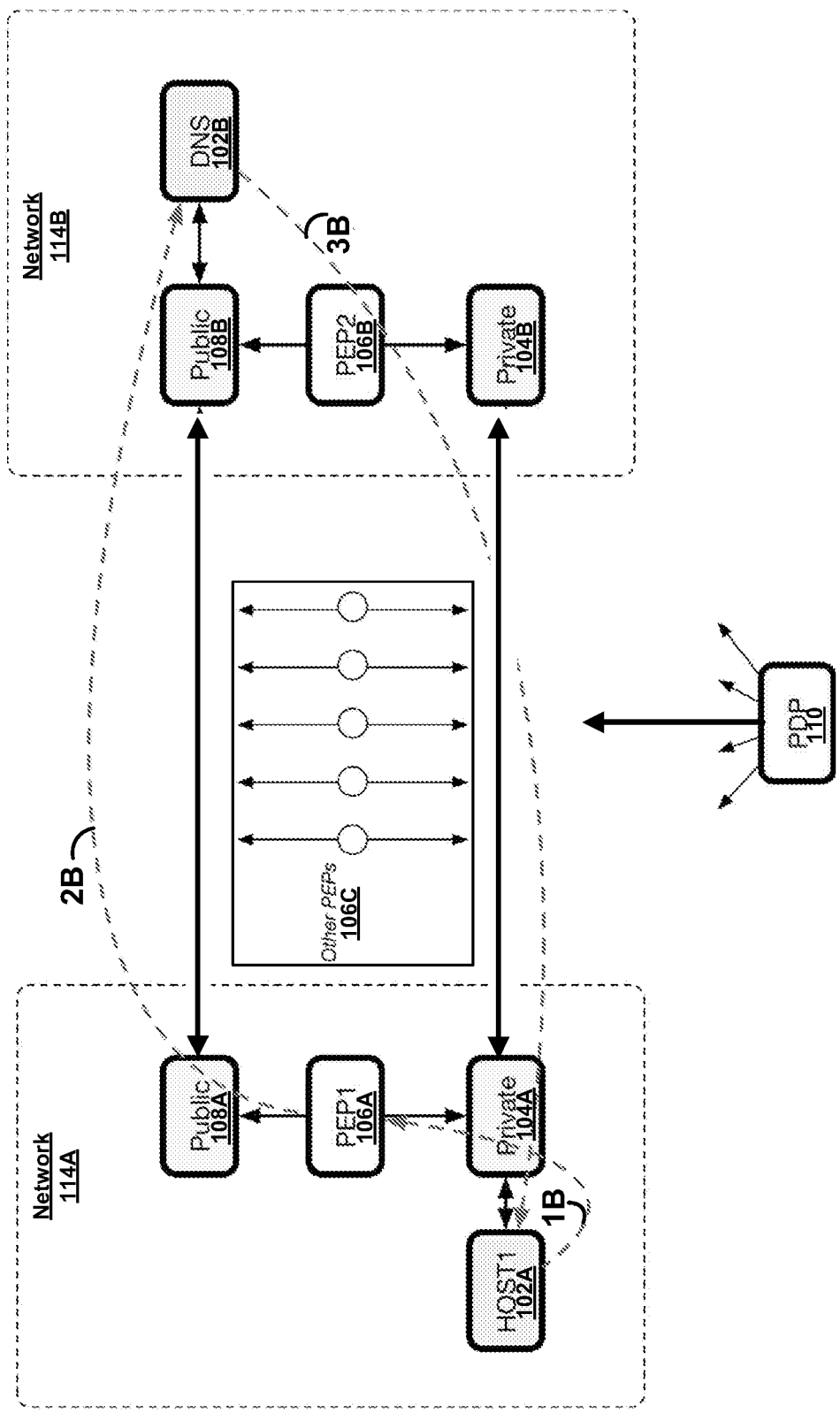
FIG. 1B shows a flowchart of an example network communications flow.

FIG. 1B shows a network communications flow for a domain name server (DNS) connection between network 114A and network 114B. To commence the DNS connection, a three-way handshake may be initiated by the destination host 102A sending a synchronization message to a DNS 102B, as shown by the connection flow 1B. The synchronization message may be associated with a request to initiate the communication session between the DNS 102B and the destination host 102A. The synchronization message may be intercepted by a first PEP 106A on the network 114A. The first PEP 106A may validate a format of the synchronization message received from the destination host 102A to ensure it complies with access control policies associated with the network 114A.

At the connection flow 2B, the first PEP 106A may forward the synchronization message to the DNS 102B (e.g., the first PEP 106A acts as a proxy for the destination host 102A). The first PEP 106A may generate an access control list entry associated with the communication session along the first connection path. The access control list entry may identify the DNS 102B and the destination host 102A and may indicate that the communication session along a connection path between the source host 102A, the first PEP 106A, and the DNS 102B is permissible. At the connection flow 3B the DNS 102B may respond (e.g., based on the synchronization message received from the first PEP 106A) with a synchronization-acknowledgement message that may pass through the second PEP 106B. The second PEP 106B may validate a format of the message received from the DNS 102B to ensure it complies with access control policies associated with the network 114B. The second PEP 106B may generate an access control list entry associated with the communication session along a second connection path. The access control list entry may identify the DNS 102B and the destination host 102A and may indicate that the communication session along a connection path between the source host 102A, the second PEP 106B, and the DNS 102B is permissible.

Figure 1C:
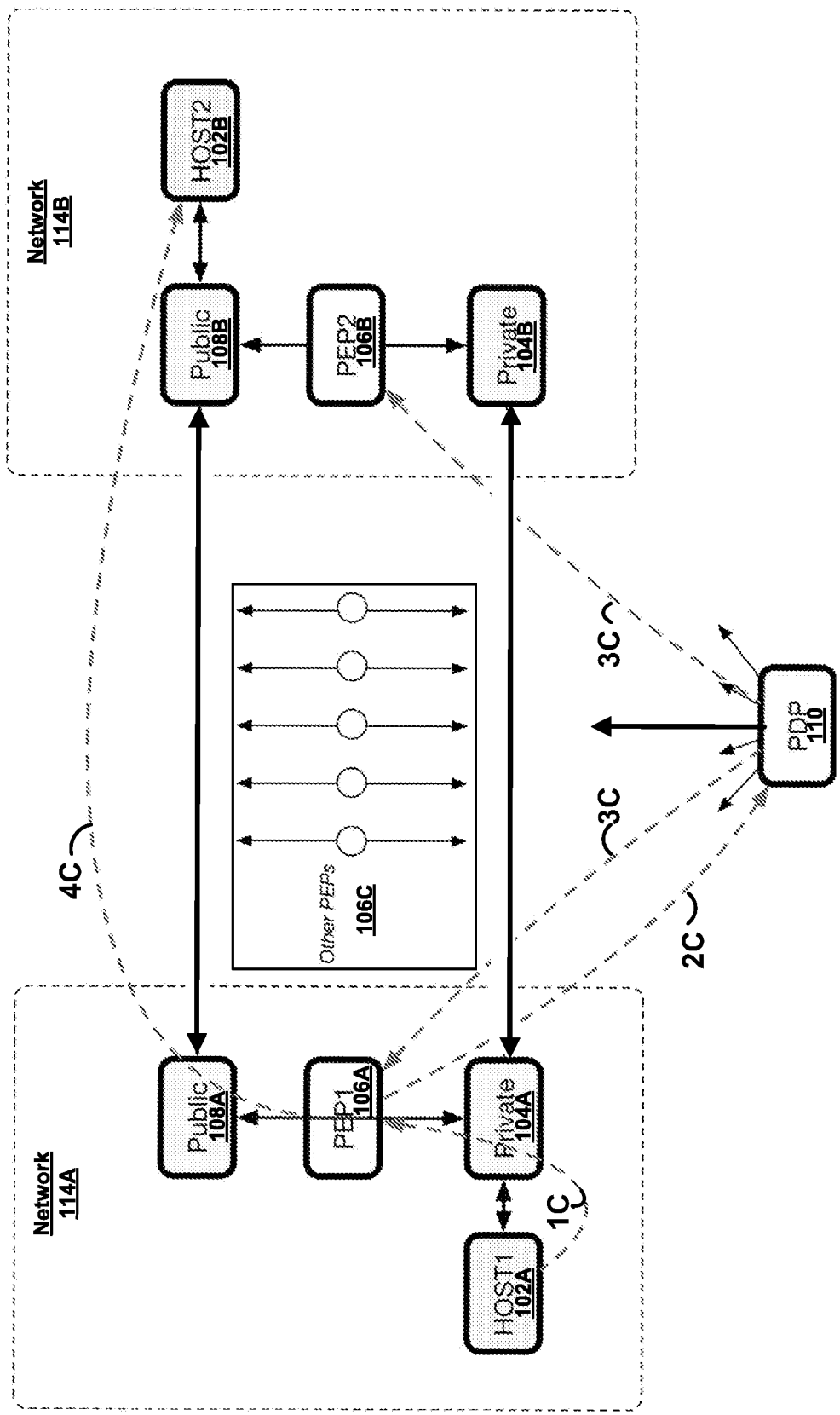
FIG. 1C shows a flowchart of an example network communications flow.

FIG. 1C shows a network communications flow for a high-trust uniform datagram protocol (UDP) communication session between network 114A and network 114B. To commence the high-trust UDP connection communication session, a three-way handshake may be initiated by the destination host 102A sending a UDP request to the source host 102B, as shown by the connection flow 1C. The UDP request may be associated with a request to initiate the high-trust UDP connection communication session between the source host 102B and the destination host 102A. The UDP request may be intercepted by a first PEP 106A on the network 114A. At the connection flow 2C, the first PEP 106A may send an inquiry message to the PDP 110 identifying the source host 102B, the destination host 102A, and the high-trust UDP connection communication session. The inquiry message may be indicative of a request to commence the high-trust UDP connection communication session.

The PDP 110 may determine that the high-trust UDP connection communication session between the source host 102B and the destination host 102A is permissible. The determination by the PDP 110 may be based on the access control policies for the network 114A and/or the network 114B. At the connection flow 3C, the PDP 110 may send a response to the first PEP 106A indicative of an approval of the high-trust UDP connection communication session between the source host 102B and the destination host 102A along a first connection path between the source host 106A, the first PEP 106A, and the destination host 102B. The PDP 110 may send a message to the second PEP 106B indicative of an approval of the high-trust UDP connection communication session between the source host 102B and the destination host 102A along a second connection path between the source host 106A, the second PEP 106B, and the destination host 102B. The PDP 110 may send a message to any additional PEPs 106C indicative of an approval of the communication session between the source host 102B and the destination host 102A along a connection path corresponding to each of the additional PEPs 106C.

The first PEP 106A may generate (e.g., based on the message received from the PDP 110 indicating the approval of the high-trust UDP connection communication session) an access control list entry associated with the high-trust UDP connection communication session along the first connection path. The access control list entry may identify the source host 102B and the destination host 102A and may indicate that the high-trust UDP connection communication session along the first connection path is permissible. The PDP 110 may generate (e.g., after the second PEP 106B receives the message indicating the approval of the high-trust UDP connection communication session) an access control list entry associated with the high-trust UDP connection communication session along the second connection path. The access control list entry may identify the source host 102B and the destination host 102A and may indicate that the high-trust UDP connection communication session along the second connection path is permissible. At the connection flow 4C, the first PEP 106A may forward the UDP request to the destination host 102A (e.g., the first PEP 106A acts as a proxy for the destination host 102A).

Figure 1D:
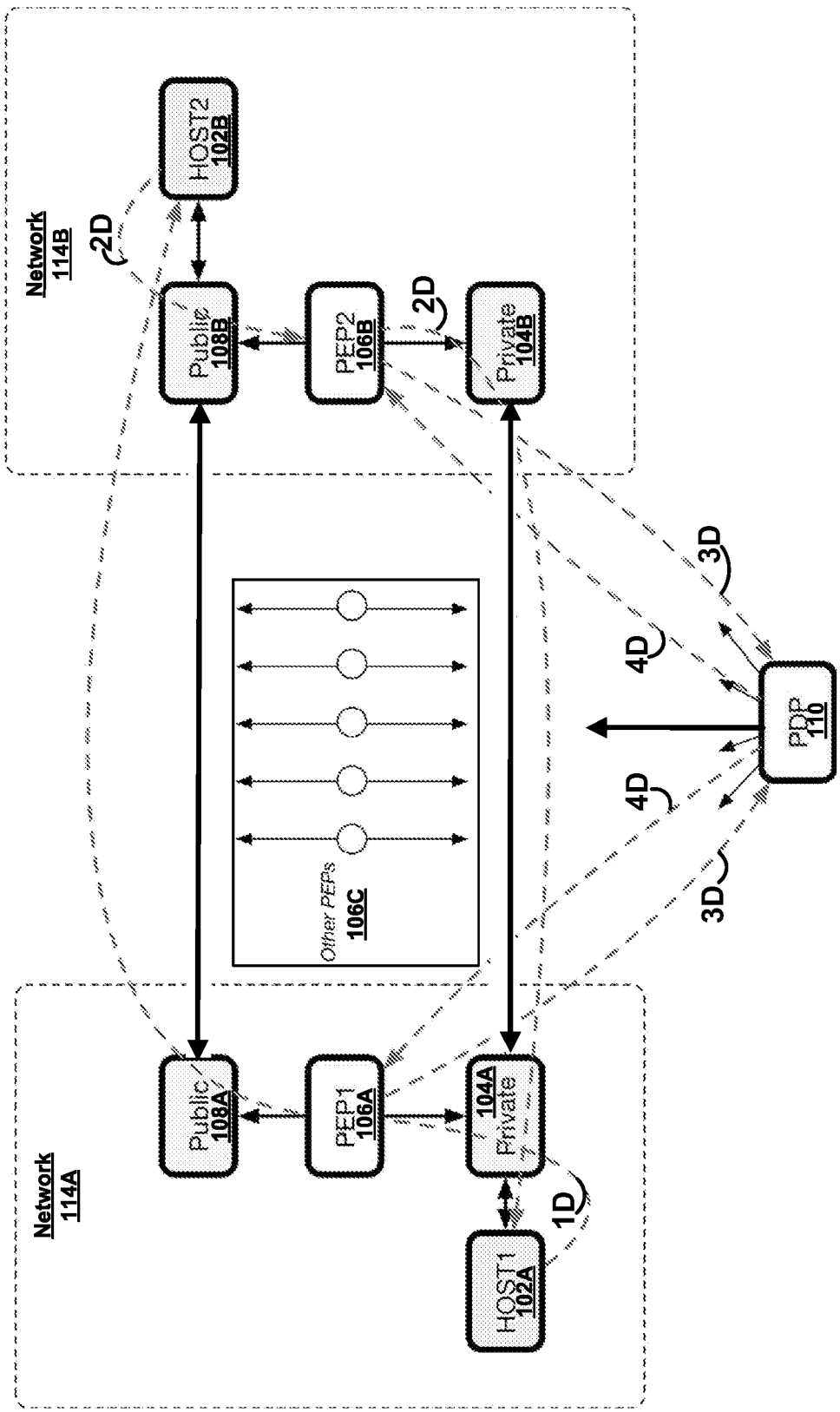
FIG. 1D shows a flowchart of an example network communications flow.

FIG. 1D shows a network communications flow for a fast-mode UDP communication session between network 114A and network 114B. To commence the fast-mode UDP connection communication session, a three-way handshake may be initiated by the destination host 102A sending a UDP request to the source host 102B, as shown at the connection flow 1D. The UDP request may be associated with a request to initiate the fast-mode UDP connection communication session between the source host 102B and the destination host 102A. The first PEP 106A may intercept the UDP request and, based on a default access control list, forward the UDP request to the source host 102B. At the connection flow 2D, the source host 102B may respond to the UDP request by sending a UDP response to the destination host 102A. The UDP response may pass through the second PEP 106B, which, based on a default access control list, may forward the UDP response to the destination host 102A.

At the connection flow 3D, the first PEP 106A and the second PEP 106B may each send an inquiry message to the PDP 110 identifying the source host 102B, the destination host 102A, and the fast-mode UDP connection communication session. The inquiry messages may be indicative of a request by each PEP 106A,106B for access control with respect to communications that pass through each respective PEP 106A,106B during the fast-mode UDP connection communication session.

The PDP 110 may determine that the fast-mode UDP connection communication session between the source host 102B and the destination host 102A is permissible. The determination by the PDP 110 may be based on the access control policies for the network 114A and/or the network 114B. At the connection flow 4D, the PDP 110 may send a response to the first PEP 106A indicative of an approval of the fast-mode UDP connection communication session between the source host 102B and the destination host 102A along a first connection path between the source host 106A, the first PEP 106A, and the destination host 102B. The PDP 110 may send a message to the second PEP 106B indicative of an approval of the fast-mode UDP connection communication session between the source host 102B and the destination host 102A along a second connection path between the source host 106A, the second PEP 106B, and the destination host 102B. The PDP 110 may send a message to any additional PEPs 106C indicative of an approval of the communication session between the source host 102B and the destination host 102A along a connection path corresponding to each of the additional PEPs 106C.

The first PEP 106A may generate (e.g., after receiving the message indicating the approval of the fast-mode UDP connection communication session from the PDP 110) an access control list entry associated with the fast-mode UDP connection communication session along the first connection path. The access control list entry may identify the source host 102B and the destination host 102A and may indicate that the fast-mode UDP connection communication session along the first connection path is permissible. The second PEP 106B may generate (e.g., after receiving the message indicating the approval of the fast-mode UDP connection communication session from the PDP 110) an access control list entry associated with the fast-mode UDP connection communication session along the second connection path. The access control list entry may identify the source host 102B and the destination host 102A and may indicate that the fast-mode UDP connection communication session along the second connection path is permissible.

Figure 2A:
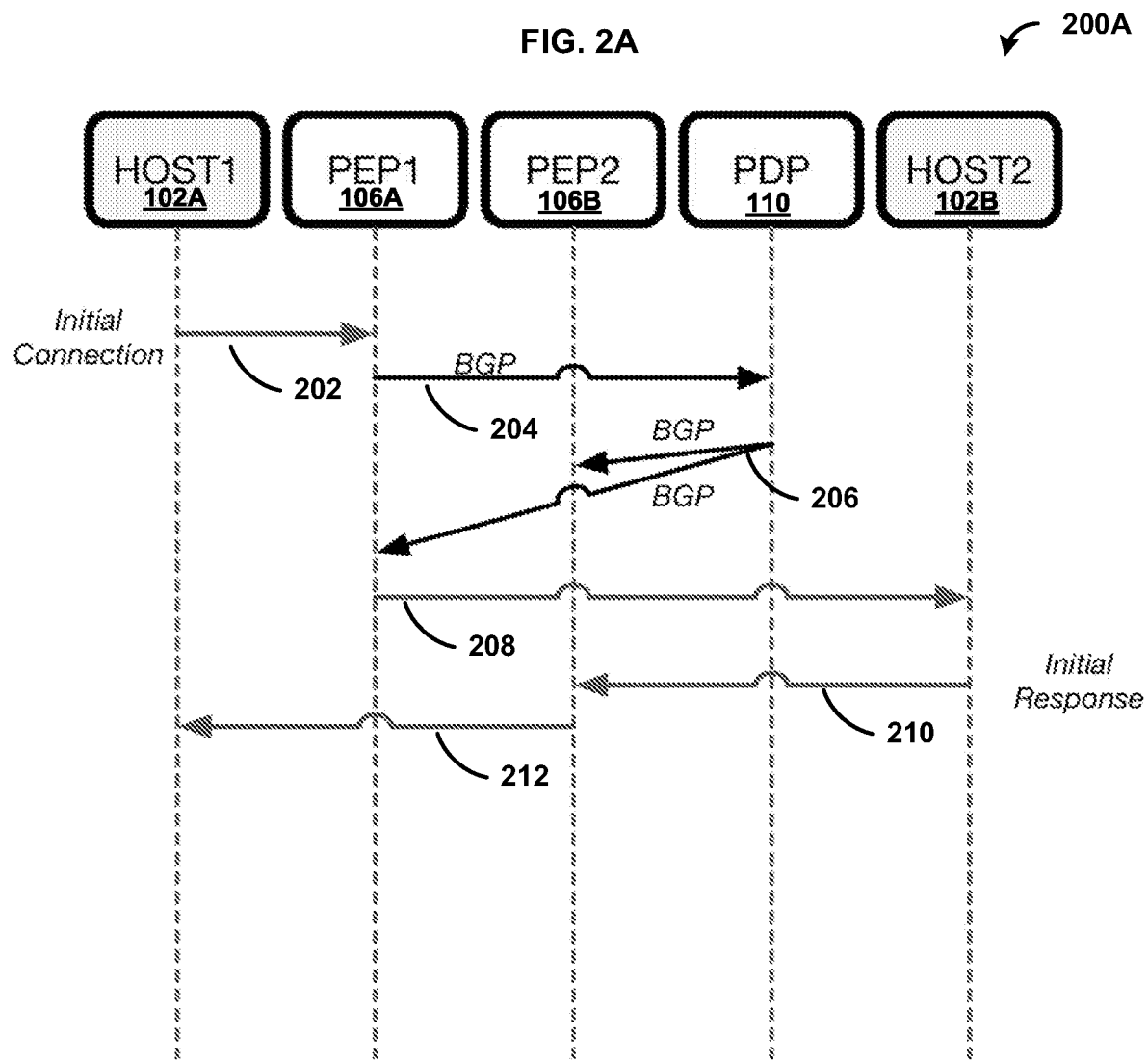
FIG. 2A shows a flowchart of an example network communications flow.

For each of the network communications flows shown in FIGS. 1A-1D, some, or all, communication between each PEP and the PDP 110 may conform to border gateway protocol ("BGP"). FIG. 2A shows communication flows 200A for BGP connection advertisement by each of the PEPs 106A,106B and the PDP 110. At the communication flow 202, upon receiving a message (e.g., TCP request, DNS request, UDP request, etc.) from the destination host 102A, the first PEP 106A may generate a BGP flow specification ("flowspec") associated with the communication session. A flowspec may be an n-tuple having criteria/requirements that may be used to check IP traffic. The criteria/requirements may be indicated by one or more values of one or more bits of data associated with a flowspec (e.g., a value of 0 or a value of 1 for a bit at a given position). A flowspec is effectively a rule for controlling and/or filtering IP network traffic, and each flowspec has a matching part, which may be encoded in a network layer reachability information ("NLRI") field, and an action part, which may be encoded as a BGP extended community. A flowspec NLRI type may have several components, such as destination prefix, source prefix, protocol, ports, and the like. A given IP packet is considered to meet the criteria/requirements of a given flowspec when the IP packet matches all components present in the flowspec.

The flowspec associated with the communication session between the destination host 102A and the source host 102B may be associated with one or more NLRI types discussed above. NLRI type 1 may be indicative of an IPv4 or IPv6 address associated with the destination host 102A. NLRI type 2 may be indicative of an IPv4 or IPv6 address associated with the source host 102B. NLRI type 3 may be indicative of the specific IP protocol associated with the communication session (e.g., IPv4 or IPv6). NLRI type 4 may be indicative of an IPv4 or IPv6 port associated with the source host 102B and/or an IPv4 or IPv6 port associated with the destination host 102A. NLRI type 5 may be indicative of an IPv4 or IPv6 port associated with the destination host 102A, and NLRI type 6 may be indicative of an IPv4 or IPv6 port associated with the source host 102B. The flowspec generated by the first PEP 106A may be identified with a traffic-action filtering type. The traffic-action filtering type may be indicative of a value of 0x8007. A bit at position 44 of the flowspec may be set to 1, and a bit at position 45 may be set to 1.

At the communication flow 204, the first PEP 106A may send an inquiry message to the PDP 110 identifying the source host 102B, the destination host 102A, and the communication session. The inquiry messages may be indicative of a request by the first PEP 106A for access control with respect to communications that pass through it during the communication session. The PDP 110 may determine whether to approve the communication session based on the inquiry message received from the first PEP 106A (e.g., the flowspec generated by the first PEP 106A). The determination may be based on one or more NLRI types and the associated information each indicates. The PDP 110 may determine that the NLRI type 1 indicative of the IPv4 or IPv6 address associated with the destination host 102A is a permissible address (e.g., communicating with the destination host 102A would not violate any access control policies). The PDP 110 may determine that the NLRI type 2 indicative of the IPv4 or IPv6 address associated with the source host 102B is a permissible address (e.g., communicating with the source host 102B would not violate any access control policies).

The PDP 110 may determine that the NLRI type 3 indicative of the IP protocol associated with the communication session (e.g., IPv4 or IPv6) conforms to the access control policies (e.g., the content being requested by the destination host 102A may be deliverable via one or both of IPv4 or IPv6). The PDP 110 may determine that the NLRI type 4 indicative of the IPv4 or IPv6 port associated with the source host 102B and/or an IPv4 or IPv6 port associated with the destination host 102A is/are permissible communication ports (e.g., communicating through the identified ports would not violate any access control policies). The PDP 110 may determine that the NLRI type 5 indicative of the IPv4 or IPv6 port associated with the destination host 102A is a permissible communication port (e.g., communicating through the identified port would not violate any access control policies). Finally, the PDP 110 may determine that the NLRI type indicative of the IPv4 or IPv6 port associated with the source host 102B is a permissible communication port (e.g., communicating through the identified port would not violate any access control policies).

The PDP 110, having determined that the communication session is approved, may generate a new flowspec indicative of an approval ("approval flowspec") of the communication session. The approval flowspec may have all, or less than all, of the information associated with the inquiry message received from the first PEP 106A (e.g., only a selection of IPv4 or IPv6 ports may be determined to be approved while others are not). The approval flowspec may be associated by the PDP 110 with a traffic-action filtering type. The traffic-action filtering type may be indicative of a value of 0x8007. A bit at position 44 of the flowspec may be set to 1, and a bit at position 45 may be set to 0. The approval flowspec may have one or more NLRI types, each of which may correspond to NLRI associated with the inquiry message. The approval flowspec may be indicative of an additional NLRI type not associated with the NLRI types indicated by the inquiry message. This additional NLRI type may be a sequence number associated with the communication session (e.g., a unique identifier indicative of the approval flowspec). The approval flowspec may be indicative of a further NLRI type not associated with the NLRI types indicated by the inquiry message. This further NLRI type may be a hash value identifying the communication session (e.g., a unique identifier indicative of the approval flowspec). The approval flowspec may be indicative of a further NLRI type not associated with the NLRI types indicated by the inquiry message. This further NLRI type may be a hash value identifying the communication session (e.g., a unique identifier indicative of the approval flowspec and the communication session).

Based on the approval flowspec, the PDP 110 may generate a forward flowspec and/or a reverse flowspec for each PEP. The forward flowspec for the first PEP 106A may be indicative of an approved connection path from the destination host 102A to the first PEP 106A to the source host 102B (e.g., a communications path for outbound communications from the destination host 102A to the source host 102B). The reverse flowspec for the first PEP 106A may be indicative of an approved connection path from the source host 102B to the first PEP 106A to the destination host 102A (e.g., a communications path for incoming communications sent to the destination host 102A by the source host 102B). The reverse flowspec for the second PEP 106B may be indicative of an approved connection path from the destination host 102A to the second PEP 106B to the source host 102B (e.g., a communications path for outbound communications from the destination host 102A sent to the source host 102B). The forward flowspec for the second PEP 106B may be indicative of an approved connection path from the source host 102B to the second PEP 106B to the destination host 102A (e.g., a communications path for communications sent to the destination host 102A by the source host 102B).

At the communication flow 206, the PDP 110 may send to the first PEP 106A both the forward flowspec for the first PEP 106A and the reverse flowspec for the first PEP 106A. Likewise at the communication flow 206, the PDP 110 may communicate to the second PEP 106B both the forward flowspec for the second PEP 106B and the reverse flowspec for the second PEP 106B. The first PEP 106A may generate an access control list entry associated with the communication session along the first connection path based on the forward flowspec and the reverse flowspec received from the PDP 110. Similarly, the second PEP 106B may generate an access control list entry associated with the communication session along the second connection path based on the forward flowspec and the reverse flowspec received from the PDP 110.

At the communications flow 208, the first PEP 106A may forward the message received from the destination host 102A to the source host 102B (e.g., the first PEP acts as a proxy for the destination host). At or near the moment the first PEP 102A forwards the message received from the destination host 102A to the source host, the second PEP 106B may receive from the PDP 110 the forward flowspec for the second PEP 106B and the reverse flowspec for the second PEP 106B. The second PEP 106B may generate an access control list entry identifying the source host 102B, the destination host 102A, and the second connection path. At the communication flow 210, the source host 102B may respond to the destination host 102A by sending a response message (e.g., SYN-ACK, UDP response, DNS response, etc.) to the destination host 102A. At the communications flow 212, the response message may pass through the second PEP 106B, which, based on the access control list entry, may forward the response message to the destination host 102A.

FIG. 2B shows communication flows 200B for updating BGP connection information for each of the PEPs 106A, 106B and the PDP 110. A communication session (e.g., TCP session, DNS connection, UDP connection, etc.) may be terminated by the destination host 102A sending a termination message to the source host 102B. The destination host 102A, having received the content it requested from the source host 102B, may send a termination message to the source host 102B indicating a cessation of the communication session. The termination message may be an RST packet, a FIN packet, or the like. At the communication flow 214, the termination message may be intercepted by the first PEP 106A. At the communication flow 216, the PDP 110 may be notified by the first PEP 106A of the termination message. The notification sent by the first PEP 106A may be indicative of the termination message and the forward flowspec and the reverse flowspec previously received from the PDP 110. The PDP 110 may generate a new flowspec indicative of a termination ("termination flowspec") of the communication session (e.g., communication between the source host 102B and the destination host 102A is no longer approved). The termination flowspec may have all, or less than all, of the information associated with the inquiry message received from the first PEP 106A. The termination flowspec may be associated by the PDP 110 with a traffic-action filtering type. A traffic-action filtering type may be assigned to the termination flowspec by the PDP 110. A value of the traffic-action filtering type may be indicative of a value of 0x8007. A bit at position 44 of the termination flowspec may be set to 0, and a bit at position 45 may be set to 1. The termination flowspec may have one or more NLRI types, each of which may correspond to NLRI associated with the inquiry message. The termination flowspec may be indicative of the sequence number associated with the communication session. The termination flowspec may be indicative of the hash value identifying the communication session. Based on the termination flowspec, the PDP 110 may generate a forward termination flowspec and/or as a reverse termination flowspec for each PEP.

The forward termination flowspec for the first PEP 106A may be indicative of a revocation of the approved connection path from the destination host 102A to the first PEP 106A to the source host 102B (e.g., the communications path for outbound communications from the destination host 102A to the source host 102B is no longer approved). The reverse termination flowspec for the first PEP 106A may be indicative of a revocation of the approved connection path from the source host 102B to the first PEP 106A to the destination host 102A (e.g., the communications path for incoming communications to the destination host 102A from the source host 102B is no longer approved). The forward termination flowspec for the second PEP 106B may be indicative of a revocation of the approved connection path from the destination host 102A to the second PEP 106B to the source host 102B (e.g., the communications path for outbound communications from the destination host 102A to the source host 102B is no longer approved). The reverse termination flowspec for the second PEP 106B may be indicative of a revocation of the approved connection path from the source host 102B to the second PEP 106B to the destination host 102A (e.g., the communications path for incoming communications to the destination host 102A from the source host 102B is no longer approved).

At the communication flow 218, the PDP 110 may communicate to the first PEP 106A both the forward termination flowspec for the first PEP 106A and the reverse termination flowspec for the first PEP 106A. Likewise at 218, the PDP 110 may communicate to the second PEP 106B both the forward termination flowspec for the second PEP 106B and the reverse termination flowspec for the second PEP 106B. The first PEP 106A may remove the access control list entry associated with the communication session along the first connection path based on the forward termination flowspec and the reverse termination flowspec received from the PDP 110. Similarly, the second PEP 106B may remove the access control list entry associated with the communication session along the second connection path based on the forward termination flowspec and the reverse termination flowspec received from the PDP 110. At the communication flow 220, the source host 102B may respond to the termination message sent by the destination host 102A by sending an acknowledgment message (e.g., FIN-ACK, etc.) to the destination host 102A. The acknowledgment message may pass through the second PEP 106B, which, based on the access control list entry, may forward the acknowledgment message to the destination host 102A.

FIG. 3 shows a method 300 for initiating a communication session between a destination host (e.g., destination host 102A) on a first network (e.g., network 114A) and a source host (e.g., source host 102B) on a second network (e.g., network 114B). At step 310, a synchronization-response message may be sent (e.g., from a PEP 106A) to the destination host. The synchronization-response message may be a synchronization-acknowledgement message, a synchronization-cookie, or the like. The synchronization-response message may be sent based on a synchronization message received (e.g., by PEP 106A) from the destination host. The synchronization message may be associated with a communication session (e.g., TCP session, UDP connection, DNS connection, etc.) between the source host and the destination host, and the synchronization-response message may be associated with establishing the communication session (e.g., the synchronization-response message causes a TCP, DNS, or UDP session to be established).

At step 320, an access control request associated with the communication session may be sent to a first computing device. The access control request may be associated with establishing a TCP, DNS, or UDP session between the source host and the destination host. The access control request may be a BGP flowspec message. The first computing device may be a PDP, such as PDP 110, that may receive the BGP flowspec message from a first PEP, such as PEP 106A.

At step 330 an authorization message may be received (e.g., by PEP 106A) from the first computing device (e.g., by PDP 110). The authorization message may be a TCP response message, a DNS response message, a UDP response message, a BGP flowspec message, or the like. The authorization message may indicate one or more of a sequence number or a hash value associated with the communication session. The sequence number and/or the hash value may be indicative of a unique identifier associated with the communication session (e.g., identifying the source host, the destination host, and the first computing device). The authorization message may be associated with a determination by the first computing device (e.g., by PDP 110) that the destination host is authorized to communicate with the source host. Based on the authorization message, an access control list entry indicative of an authorization of the communication session may be determined (e.g., by PEP 106A). The access control list entry may be associated with a first connection path between the destination host and the source host (e.g., a connection path along a first network associated with the destination host).

At step 340, based on the access control list entry, the synchronization message may be sent (e.g., forwarded on behalf of the destination host by PEP 106A) to the source host to cause the communication to be established. The synchronization message may be sent to the source host via the first connection path. Prior to, or simultaneously with, the source host receiving the synchronization message from the destination host (e.g., from PEP 106A via the first connection path), a second computing device (e.g., PEP 106B) may receive a flowspec message (e.g., a BGP flowspec message) from the first computing device (e.g., PDP 110) indicative of the authorization of the communication session. Based on the flowspec message, the second computing device may determine a second access control list entry. The second access control list entry may be associated with a second connection path between the destination host, the second computing device, and the source host (e.g., a connection path along a second network associated with the source host 102B). The second computing device may receive a synchronization-acknowledgement message from the source host (e.g., sent by the source host in response to receiving the synchronization-response from the destination host). The second computing device may determine that the synchronization-acknowledgement message is legitimate based on the access control list entry. The second computing device may send the synchronization-acknowledgement message to the destination host (e.g., along the second connection path).

A connection termination message associated with the communication session may be received (e.g., by PEP 106A) from the destination host. Based on the connection termination message, a removal message may be sent to the first computing device. An update message indicative of a termination of the communication session may be received from the first computing device. One or more of the connection termination message, the removal message, or the update message may each be a TCP message, a DNS message, a UDP message, a BGP flowspec message, or the like. The update message may be received in response to the first computing device (e.g., PDP 110) determining that the communication session is no longer authorized. Based on the update message, the access control list entry indicative of the authorization of the communication session (e.g., along the first connection path) may be removed (e.g., by PEP 106A). The second computing device (e.g., PEP 106B) may receive the update message from the first computing device. Based on the update message, the second computing device may remove the second access control list entry indicative of the authorization of the communication session (e.g., along the second connection path).

FIG. 4 shows a method 400 for initiating a communication session between a destination host (e.g., the destination host 102A) on a first network (e.g., the network 114A) and a source host (e.g., the source host 102B) on a second network (e.g., the network 114B). At step 410, an authorization message (e.g., a BGP flowspec message) may be received (e.g., by PEP 106B) from a first computing device (e.g., PDP 110). The first computing device may be associated with a first network. The authorization message may be indicative of an authorization of a communication session between the source host and the destination host (e.g., indicative of an authorization by the PDP 110 of an access control request associated with the communication session). The authorization message may be sent by the first computing device based on the first computing device authorizing the communication session (e.g., based on the PDP 110 approving the access control request associated with the communication session).

At step 420, based on the authorization message, an access control list entry associated with the communication session may be determined (e.g., by PEP 106B). The access control list entry may be associated with a connection path between the destination host and the source host (e.g., a connection path between the destination 102A, PEP 106B, and the source host 102B). The connection path may be associated with a second network (e.g., a network associated with PEP 106B).

At step 430, a synchronization-acknowledgement message may be received from the source host. The synchronization-acknowledgement message may be received from the source host based on with a synchronization message (e.g., a synchronization-cookie) received by the source host from a second computing device. The synchronization message may originate from the destination host, and the second computing device may send the synchronization message to the source host on behalf of the destination host. The second computing device (e.g., PEP 106A) may be associated with the destination host and the first network (e.g., the synchronization message may be received by the source host 102B via a connection path associated with the first network and PEP 106A). The authorization message may be received from the first computing device prior to receiving the synchronization-acknowledgement message from the source host. The authorization message may indicate one or more of a sequence number or a hash value associated with the communication session. The sequence number and/or the hash value may be indicative of a unique identifier associated with the communication session (e.g., identifying the source host, the destination host, the first computing device, and the second computing device). The authorization message may be associated with a determination by the first computing device (e.g., by PDP 110) that the destination host is authorized to communicate with the source host.

At step 440, based on the access control list entry, it may be determined that that the destination host is authorized to communicate with the source host (e.g., determining that the synchronization-acknowledgement message may be sent to the destination host). Communication between the destination host and the source host may be via the connection path between the destination host and the source host (e.g., the connection path between the destination 102A, PEP 106B, and the source host 102B).

At step 450, based on the destination host being authorized to communicate with the source host, the synchronization-acknowledgement message may be sent to the destination host to cause the communication to be established. The synchronization-acknowledgement message may be sent to the source host via the connection path between the destination host and the source host (e.g., the connection path between the destination 102A, PEP 106B, and the source host 102B).

An update message associated with the communication session may be received from the first computing device. The update message may be based on a connection termination message sent by the destination host to the first computing device. The update message may be indicative of a termination of the communication session. The update message may each be a BGP flowspec message sent by the first computing device based on a removal message received by the first computing device from a second computing device (e.g., PEP 106A) associated with the destination host. Based on the update message, the access control list entry associated with the communication session may be removed.

FIG. 5 shows a method 500 for initiating a communication session (e.g., a TCP session, a DNS connection, or a UDP connection) between a destination host (e.g., the destination host 102A) on a first network (e.g., the network 114A) and a source host (e.g., the source host 102B) on a second network (e.g., the network 114B). At step 510, an access control request may be received (e.g., by PDP 110) from a first computing device on a first network. The access control request may be associated with establishing a communication session, such as a TCP, a DNS, or a UDP session, between the source host on the first network and the destination host on the second network. The access control request may be a BGP flowspec message. The first computing device may be a policy enforcement point (e.g., PEP 106A) that may receive a synchronization message associated with the communication session from the source host.

At step 520, based on the access control request, the communication session may be determined to be authorized along a first connection path and along a second connection path. The first connection path may be associated with a first network on which the destination host and the first computing device communicate. The second connection path may be associated with a second network on which the source host and a second computing device communicate. The second computing device may be a policy enforcement point (e.g., PEP 106B).

At step 530, based on the communication session being authorized, a first authorization message indicative of the authorization of the communication session along the first connection path may be sent to the first computing device. The first authorization message may be a TCP response message, a DNS response message, a UDP response message, a BGP flowspec message, or the like. The first authorization message may indicate one or more of a sequence number or a hash value associated with the communication session. The sequence number and/or the hash value may be indicative of a unique identifier associated with the communication session (e.g., identifying the source host, the destination host, and the first computing device). Based on the first authorization message, the first computing device (e.g., PEP 106A) may determine a first access control list entry indicative of an authorization of the communication session. The first access control list entry may be associated with the first connection path between the destination host and the source host. Based on the first authorization message, the first computing device may cause the communication session to be established.

At step 540, based on the communication session being authorized, a second authorization message indicative of the authorization of the communication session along the second connection path may be sent to the second computing device. The second authorization message may be a TCP response message, a DNS response message, a UDP response message, a BGP flowspec message, or the like. The second authorization message may indicate one or more of the sequence number or the hash value associated with the communication session. Based on the second authorization message, the second computing device (e.g., PEP 106B) may determine a second access control list entry indicative of an authorization of the communication session. The second access control list entry may be associated with the second connection path between the destination host and the source host. The second authorization message may facilitate communication between the source host and the destination host along the second connection path via the second computing device.

The first computing device may send, via the first connection path, a synchronization-response message (e.g., a synchronization-cookie) to the source host prior to or simultaneously with the second computing device receiving the second authorization message. The first computing device may receive a connection termination message associated with the communication session from the destination host. Based on the connection termination message, a removal message may be received from the first computing device. Based on the removal message, an update message indicative of a termination of the communication session may be sent to the first computing device. The update message may be sent in response to determining, based on the removal message, that the communication session is no longer authorized. Based on the update message, the first computing device may remove the first access control list entry.

The second computing device may determine a second access control list entry based on the second authorization message. The second access control list entry may be associated with the second connection path. The second computing device may receive a synchronization-acknowledgement message from the source host based on the synchronization message received by the source host from the first computing device. The second computing device may send the synchronization-acknowledgement message to the destination host via the second connection path. The update message may be received by the second computing device. Based on the update message, the second computing device may remove the second access control list entry. One or more of the connection termination message, the removal message, or the update message may each be a TCP message, a DNS message, a UDP message, a BGP flowspec message, or the like.

Figure 6:
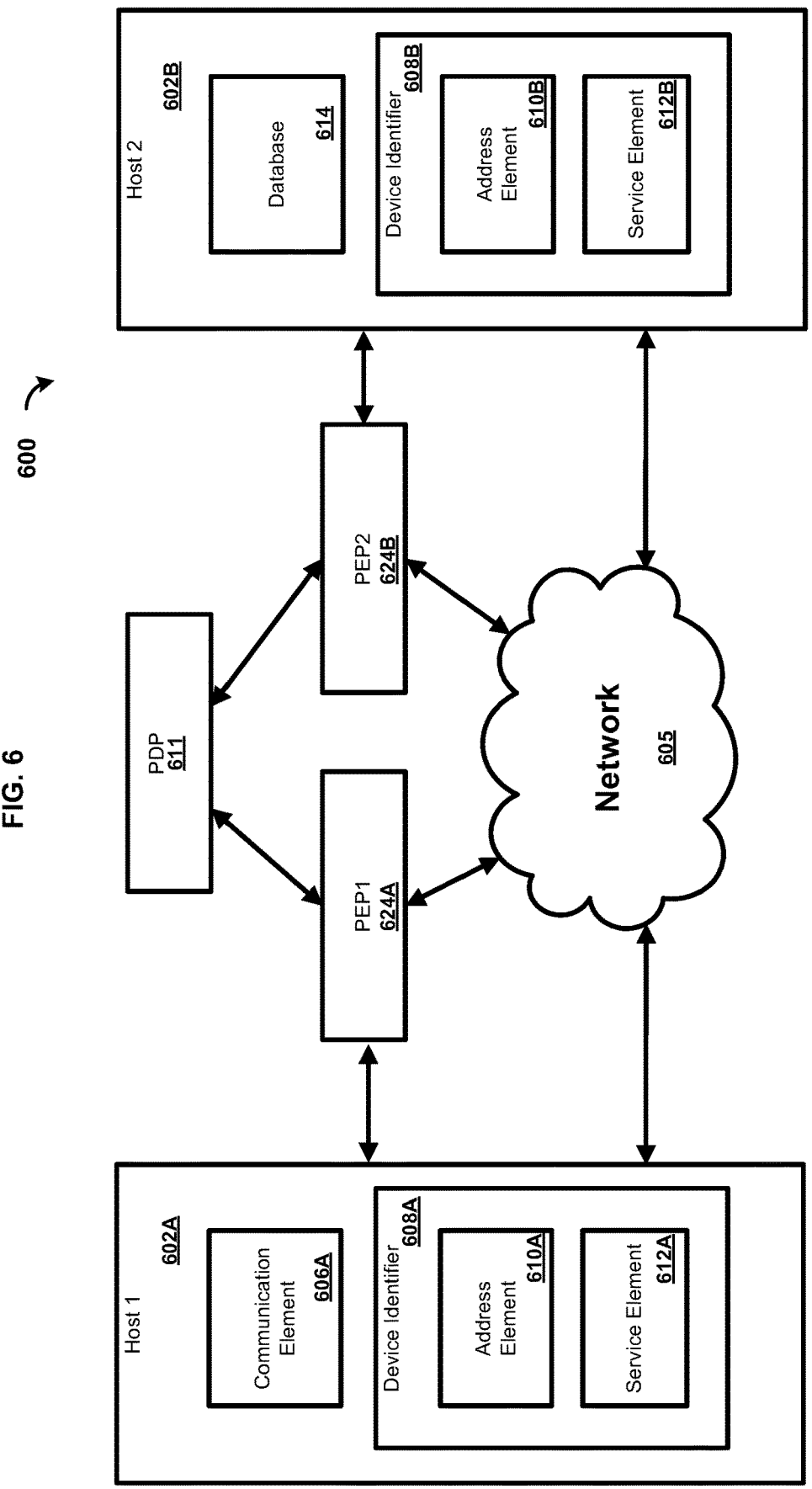
FIG. 6 shows a block diagram of an example system.

FIG. 6 shows a system 600 that may be configured to provide content requested by a destination host 602A. The destination host 602A may be in communication with a source host 602B, such as a server. The destination host 602A and the source host 602B may be in communication via a private and/or public network 605 such as the Internet or other network. Other forms of communications may be used such as wired and wireless telecommunication channels. The destination host 602A may be a content delivery network in communication with an electronic device such as a computer, a smartphone, a laptop, a tablet, a set top box, a display device, or other device capable of receiving content from the source host 602B via a request by the destination host 602A. The destination host 602A may have a communication element 606A for providing an interface to a user to interact with the destination host 602A (e.g., to request content). The communication element 606A may be any interface for presenting and/or receiving information to/from the user, such as user feedback. An interface may be communication interface such as a web browser (e.g., Internet Explorer °, Mozilla Firefox, Google Chrome®, Safari®, or the like). Other software, hardware, and/or interfaces may be used to provide communication between the user and one or more of the destination host 602A and the source host 602B. The communication element 606A may be used to request or query various files from a local source and/or source host 602B. The communication element 606A may facilitate a transmission of request data to a local or remote device such as the source host 602B.

The destination host 602A may be associated with a device identifier 608A. The device identifier 608A may be any identifier, token, character, string, or the like, for differentiating one device (e.g., destination host 602A) from device. Other information may be represented by the device identifier 608A. The device identifier 608A may have an address element 610A and a service element 612A. The address element 610A may have or provide an internet protocol address, a network address, a media access control (MAC) address, an Internet address, or the like. The address element 610 may be relied upon to establish a communication session between the destination host 602A and the source host 602B or other devices and/or networks. The address element 610A may be used as an identifier or locator of the destination host 602A. The address element 610A may be persistent for a particular network.

The service element 612A may have an identification of a service provider associated with the destination host 602A and/or with the class of destination host 602A. The class of the destination host 602A may be related to a type of user device to receive requested content, capability of device to receive requested content, type of service/requested content being provided, and/or a level of service (e.g., business class, service tier, service package, etc.). The service element 612A may indicate information relating to or provided by a communication service provider (e.g., Internet service provider) that is providing or enabling data flow such as communication services to the destination host 602A. The service element 612A may have information relating to a preferred service provider for one or more particular services relating to the destination host 602A. The address element 610A may be used to identify or retrieve data from the service element 612A, or vice versa. One or more of the address element 610A and the service element 612A may be stored remotely from the destination host 602A and retrieved by one or more devices such as the destination host 602A and the source host 602B. Other information may be represented by the service element 612A.

The source host 602B may be associated with a device identifier 608B. The device identifier 608B may be any identifier, token, character, string, or the like, for differentiating one device (e.g., source host 602B) from device. Other information may be represented by the device identifier 608B. The device identifier 608B may have an address element 610B and a service element 612B. The address element 610B may have or provide an internet protocol address, a network address, a media access control (MAC) address, an Internet address, or the like. The address element 610B may be relied upon to establish a communication session between the destination host 602A and the source host 602B or other devices and/or networks. The address element 610B may be used as an identifier or locator of the source host 602B. The address element 610B may be persistent for a particular network.

The service element 612B may indicate information relating to or provided by a communication service provider (e.g., Internet service provider) that is providing or enabling data flow such as communication services to the source host 602B. The service element 612B may have information relating to a preferred service provider for one or more particular services relating to the source host 602B. The address element 610B may be used to identify or retrieve data from the service element 612B or vice versa. One or more of the address element 610B and the service element 612B may be stored remotely from the source host 602B and retrieved by one or more devices such as the destination host 602A and the source host 602B. Other information may be represented by the service element 612B.

The source host 602B may be a server for communicating with the destination host 602A. The source host 602B may communicate with the destination host 602A for providing data and/or services. The source host 602B may allow the destination host 602A to interact with remote resources such as data, devices, and files. The computing device may be configured as (or disposed at) a central location (e.g., a headend, or processing facility), which may receive content (e.g., data, input programming) from multiple sources. The source host 602B may combine the content from the multiple sources and may distribute the content to user (e.g., subscriber) locations via a distribution system.

The source host 602B may manage the communication between the destination host 602A and a database 614 for sending and receiving data therebetween. The database 614 may store a plurality of files (e.g., content), user identifiers or records, or other information. The destination host 602A may request and/or retrieve a file from the database 614. The database 614 may store information relating to the destination host 602A such as the address element 610A and/or the service element 612A. The source host 602B may obtain the device identifier 608A from the destination host 602A and retrieve information from the database 614 such as requested content. The source host 602B may obtain the address element 610A from the destination host 602A. Any information may be stored in and retrieved from the database 614. The database 614 may be disposed remotely from the source host 602B and accessed via direct or indirect connection. The database 614 may be integrated with a computing system or some other device or system.

A first policy enforcement point (first PEP) 624A may be in communication with a network such as a network 105. The first PEP 624A may be a router, computer, or other hardware configured to implement access control policies for a network. The first PEP 624A may facilitate the connection of the destination host 602A to the source host 602B via the network 105. The first PEP 624A may be part of a local area network (LAN) or a wide area network (WAN) with respect to the destination host 602A. The first PEP 624A may be identified by an Internet Protocol (IP) Address IPV4/IPV6 or a media access control address (MAC address) or the like.

A second PEP 624B may be in communication with a network such as a network 605. The second PEP 624B may be a router, computer, or other hardware configured to implement access control policies for a network. The second PEP 624B may facilitate the connection of the source host 602B to the destination host 602A via the network 605. The second PEP 624B may be part of a local area network (LAN) or a wide area network (WAN) with respect to the source host 602B. The second PEP 624B may be identified by an Internet Protocol (IP) Address IPV4/IPV6 or a media access control address (MAC address) or the like.

The first PEP 624A may serve as an intermediary that intercepts outbound network traffic generated by the destination host 602A, such as a request to initiate a communication session with the source host 602B in order to receive requested content (e.g., requested by a device in communication with the destination host 602A). The destination host 602A may attempt to access the source host 602B using a predefined URL (or other identifier). The first PEP 624A may generate an inquiry message (e.g., a BGP flowspec) that is sent to a policy decision point (PDP) 611. The inquiry message may include the URL (or other identifier) of the source host 602A, with the PDP 611 being configured to determine whether the destination host 602A receiving content from the source host 602B complies with one or more access control policies associated with the destination host 602A. The PDP 611 may transmit an indication (e.g., a BGP flowspec) of an approval of the connection between the destination host 602A and the source host 602B. The indication of the approval may be provided to the first PEP 624A and the second PEP 624B. If the PDP 611 instead determines that the connection between the destination host 602A and the source host 602B would violate one or more access control policies associated with the destination host 602A, then the PDP 611 may reject, block, or otherwise deny transmission of the request to initiate a communication session with the source host 602B.

The first PEP 624A may receive the indication of the approval from the PDP 611 in response to the inquiry message. The indication of the approval may identify an IP address corresponding to the URL (or other identifier) included in the request to initiate a communication session. The first PEP 624A may permit access to the IP address by the destination host 602A (e.g., by the device that generated the request to initiate a communication session with the source host 602B). The first PEP 624A may generate an access control list entry indicating that the destination host 602A may receive content from the IP address (e.g., of the source host 602B) provided with the indication of the approval from the PDP 611. The access control list entry may be generated on a per-request basis, thereby allowing access to the IP address by the device (e.g., user device, etc.) associated with the destination host 602A that generated the request to initiate a communication session. The access control list entry may be generated on a per-port basis, thereby allowing access to the IP address directed to a particular port.

The second PEP 624B may receive the indication of the approval from the PDP 611. The indication of the approval may identify an IP address corresponding to the URL (or other identifier) included in the request to initiate a communication session. The second PEP 624B may permit outbound traffic originating from the source host 602B and sent to the destination host 602A. The second PEP 624B may generate an access control list entry indicating that the source host 602B may communicate with the destination host 602A.

The first PEP 624A may forward the request to initiate a communication session to the source host 602A. The indication of the approval may be received by the second PEP 624B prior to, or simultaneously with, the first PEP 624A forwarding the request to initiate a communication session to the source host 602A. In response to the request to initiate a communication session, the source host 602B may respond to the destination host 624B by sending an acknowledgement of the request to initiate a communication session (e.g., a synchronization-acknowledgement message, etc.). The acknowledgement may be sent to the destination host 624A by the source host 602B via the second PEP 624B (e.g., the second PEP 624B intercepts the response). Based on the access control list entry generated by the second PEP 624B, the second PEP 624B may forward the acknowledgement to the destination host 602A (e.g., the acknowledgement does not pass through the first PEP 624A).

The destination host 602A may send a termination message (e.g., a BGP flowspec update) to the source host 624B in order to terminate the communication session (e.g., the destination host 602A has received all requested content). The termination message may be intercepted by the first PEP 624A, which may remove the generated access control list entry associated with the communication session. The first PEP 624A may forward the termination message to the source host 602B. The source host 602B may respond with an acknowledgment of the termination message (e.g., a FIN-ACK message, etc.). The acknowledgment of the termination message may be sent to the source host 602B from destination host 602A via the second PEP 624B, which may remove the generated access control list entry associated with the communication session. The second PEP 624B may forward an acknowledgment of the termination message to the destination host 602A. The acknowledgment of the termination message may travel through the first connection path to the destination host 602A (e.g., passing through the first PEP 624A) or it may travel through the second connection path to the destination host 602A (e.g., passing through the second PEP 624B). The PEP that receives the acknowledgment of the termination message may provide an indication to the PDP 611 that it received the acknowledgment of the termination message. The PDP 611 may revoke the approval of the communication session based on the indication received from the PEP which received the acknowledgment of the termination message. An indication of the revocation may be sent by the PDP 611 to each PEP that received the indication of the approval of the communication session.

Figure 7:
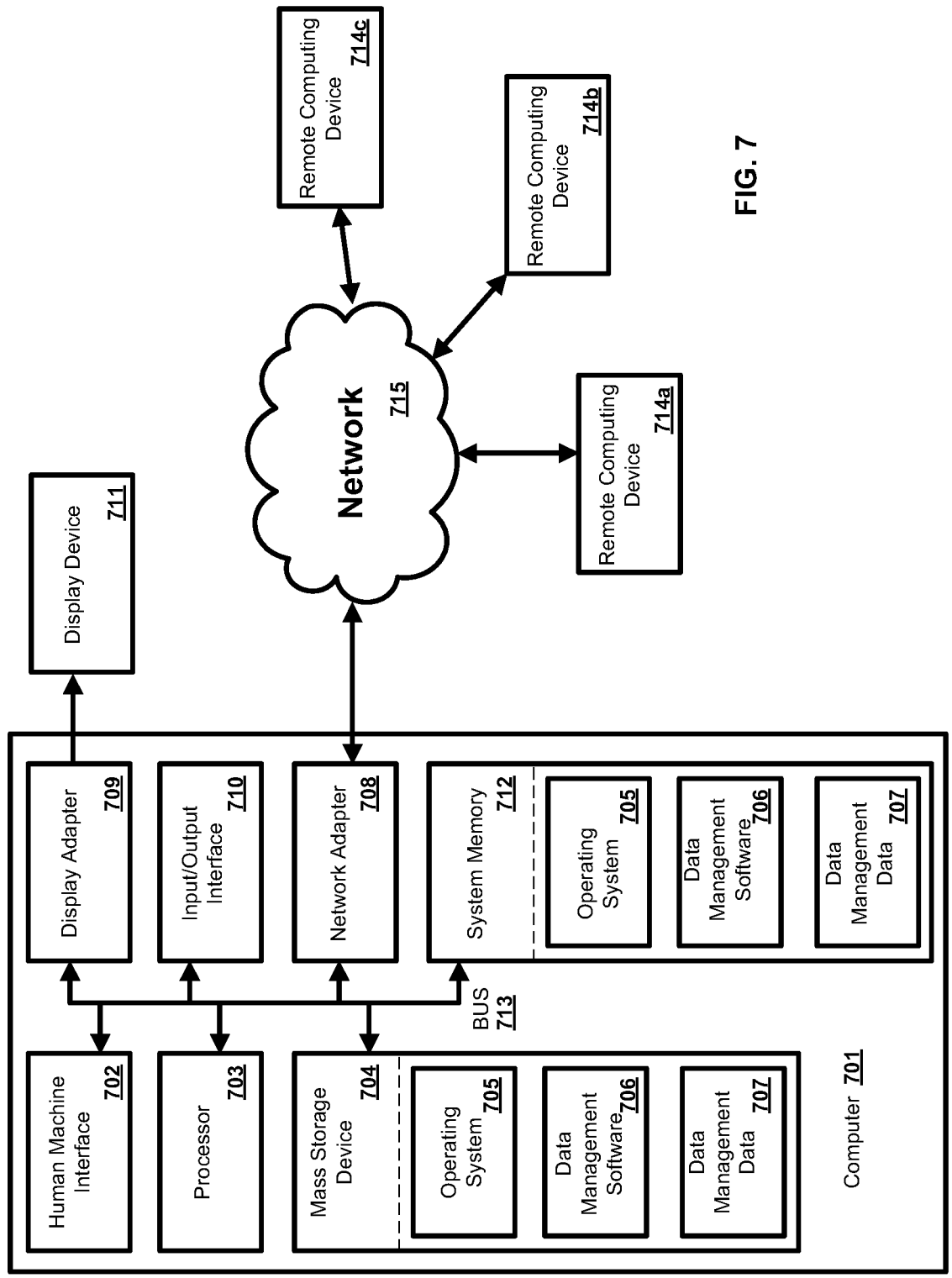
FIG. 7 shows a block diagram of an example computing device.

The methods, systems, and apparatuses described herein may be implemented on a computer 701 as shown in FIG. 7 and described below. The source host 602B and/or the destination host 602A shown in FIG. 6, and the source host 102B and/or the destination host 102A shown in FIG. 1, may be one or more computers as shown in FIG. 7. Similarly, the methods, systems, and apparatuses described herein may utilize one or more computers to perform one or more functions in one or more locations. FIG. 7 is a block diagram of an operating environment for performing the described methods. This operating environment is only one type of operating environment and is not intended to suggest any limitation as to the scope of use or functionality of operating environment architecture. Neither should the operating environment be interpreted as having any dependency or requirement relating to any one or combination of components shown in the operating environment.

The methods, systems, and apparatuses described herein may be operational with numerous other general purpose or special purpose computing system environments or configurations. Well known computing systems, environments, and/or configurations that may be suitable for use with the systems and methods are personal computers, server computers, laptop devices, multiprocessor systems, etc. Additional computing system environments or configurations may be set top boxes, programmable consumer electronics, network PCs, minicomputers, mainframe computers, distributed computing environments using any of the above systems or devices, and the like.

The processing of the described methods, systems, and apparatuses may be performed by software components. The described systems and methods may be described in the general context of computer-executable instructions, such as program modules, being executed by one or more computers or other devices. Generally, program modules are computer code, routines, programs, objects, components, data structures, etc. that perform particular tasks or implement particular abstract data types. The described methods may be practiced in grid-based and distributed computing environments where tasks are performed by remote processing devices that are linked through a communications network. In a distributed computing environment, program modules may be located in both local and remote computer storage media including memory storage devices.

One skilled in the art will appreciate that the systems and methods described herein may be implemented via a general-purpose computing device in the form of a computer 701. The components of the computer 701 may be, but are not limited to, one or more processors 703, a system memory 712, and a system bus 713 that couples system components including the one or more processors 703 to the system memory 712. The system may utilize parallel computing.

The system bus 713 represents one or more of several possible types of bus structures, including a memory bus or memory controller, a peripheral bus, an accelerated graphics port, or local bus using any of a variety of bus architectures. Such architectures may be an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description may be implemented over a wired or wireless network connection and each of the subsystems, including the one or more processors 703, a mass storage device 704, an operating system 705, data management software 706, data management data 707, a network adapter 708, the system memory 712, an Input/Output Interface 710, a display adapter 709, a display device 711, and a human machine interface 702, may be contained within one or more remote computing devices 714a,b,c at physically separate locations, connected through buses of this form, in effect implementing a fully distributed system.

The computer 701 may have a variety of computer readable media. Exemplary readable media may be any available media that is accessible by the computer 701 such as volatile and non-volatile media, removable and non-removable media. The system memory 712 may be computer readable media in the form of volatile memory, such as random access memory (RAM), and/or non-volatile memory, such as read only memory (ROM). The system memory 712 typically contains data such as the data management data 707 and/or program modules such as the operating system 705 and the data management software 706 that are immediately accessible to and/or are presently operated on by the one or more processors 703.

The computer 701 may have removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including the operating system 705 and the data management software 706. Each of the operating system 705 and the data management software 706 (or some combination thereof) may have elements of the programming and the data management software 706. The data management data 707 may be stored on the mass storage device 704. The data management data 707 may be stored in any of one or more databases known in the art. Examples of such databases are DB2®, Microsoft® Access, Microsoft® SQL Server, Oracle®, mySQL, PostgreSQL, and the like. The databases may be centralized or distributed across multiple systems.

A user may enter commands and information into the computer 701 via an input device (not shown). Examples of such input devices are a keyboard, pointing device (e.g., a "mouse"), a microphone, a joystick, a scanner, tactile input devices such as gloves, and other body coverings, and the like These and other input devices may be connected to the one or more processors 703 via the human machine interface 702 that is coupled to the system bus 713, but may be connected by other interface and bus structures, such as a parallel port, game port, an IEEE 1394 Port (also known as a Firewire port), a serial port, or a universal serial bus (USB).

The display device 711 may be connected to the system bus 713 via an interface, such as the display adapter 709. It is contemplated that the computer 701 may have more than one display adapter 709 and the computer 701 may have more than one display device 711. The display device 711 may be a monitor, an LCD (Liquid Crystal Display), or a projector. In addition to the display device 711, other output peripheral devices may be components such as speakers (not shown) and a printer (not shown) which may be connected to the computer 701 via the Input/Output Interface 710. Any step and/or result of the methods may be output in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714a,b,c. A remote computing device may be a personal computer, portable computer, smartphone, a server, a router, a network computer, a peer device or other common network node, and so on. Logical connections between the computer 701 and a remote computing device 714a,b,c may be made via a network 715, such as a local area network (LAN) and/or a general wide area network (WAN). Such network connections may be through the network adapter 708. The network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the data management software 706 may be stored on or sent across some form of computer readable media. Any of the described methods may be performed by computer readable instructions embodied on computer readable media. Computer readable media may be any available media that may be accessed by a computer. Computer readable media may be "computer storage media" and "communications media." "Computer storage media" may be volatile and non-volatile, removable and non-removable media implemented in any methods or technology for storage of information such as computer readable instructions, data structures, program modules, or other data. Exemplary computer storage media may be RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The descriptions herein of the methods, systems, and apparatuses are intended to provide those of ordinary skill in the art with a complete description of how the articles, devices and/or methods claimed herein are made and evaluated, and are intended to be purely exemplary and are not intended to limit the scope of the methods, systems, and apparatuses. Efforts have been made to ensure accuracy with respect to numbers (e.g., time, amounts, etc.), but some errors and deviations should be accounted for.

The methods, systems, and apparatuses may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The descriptions herein of the methods, systems, and apparatuses are not intended to limit their scope. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow or plain meaning derived from grammatical organization or punctuation.

It will be apparent to those skilled in the art that various modifications and variations may be made without departing from the scope or spirit. Other modifications and variations will be apparent to those skilled in the art from consideration of the specification and practice described herein. It is intended that the specification and descriptions therein be considered as exemplary only, with a true scope and spirit being indicated by the following claims.

What is claimed is:

1. A method comprising:
    based on a first message associated with establishing a communication session between a source host device and a destination host device, sending, to the destination host device, a second message associated with establishing the communication session;
    sending, to a first computing device, an access control request associated with the communication session;
    determining, based on an authorization message associated with the first computing device, an access control list entry indicative of an authorization of the communication session; and
    sending, based on the access control list entry being indicative of authorization of the communication session, the first message to the source host device, wherein the first message causes the communication session to be established.

2. The method of claim 1, wherein the communication session comprises a transmission control protocol (TCP) session, a domain name server (DNS) session, or a uniform datagram protocol (UDP) session.

3. The method of claim 1, wherein the first computing device comprises a policy decision point, wherein the access control request comprises a first border gateway protocol flowspec message, and wherein the authorization message comprises a second border gateway protocol flowspec message.

4. The method of claim 1, further comprising:
    sending, based on a connection termination message, a removal message to the first computing device; and
    removing, from an access control list, based on an update message associated with the first computing device, the access control list entry.

5. The method of claim 1, further comprising:
    determining, by a second computing device based on a border gateway protocol flowspec message associated with the first computing device, that a synchronization-acknowledgement message associated with the source host device is legitimate; and
    sending, by the second computing device, the synchronization-acknowledgement message to the destination host device.

6. The method of claim 5, wherein the second computing device comprises a policy enforcement point, and wherein the method further comprises:
receiving, by the second computing device, an update message from the first computing device, wherein the update message is indicative of a termination of the communication session.

7. The method of claim 1, wherein the first message comprises at least one of:
a synchronization message;
a message associated with a three-way handshake between the source host device and the destination host device; or
a sequence number associated with the communication session; and
wherein the second message comprises at least one of:
a synchronization-response message;
an acknowledgement message;
a message associated with a three-way handshake between the source host device and the destination host device; or
a sequence number associated with the communication session.

8. A method comprising:
receiving, from a source host device, a first message associated with establishing a communication session between the source host device and a destination host device;
sending, to a first computing device, an access control request associated with the communication session;
determining, based on an authorization message associated with the first computing device, that the destination host device is authorized to communicate with the source host device; and
sending, based on the authorization message, and based on the destination host device being authorized to communicate with the source host device, the first message to the source host device, wherein the first message causes the communication session to be established.

9. The method of claim 8, wherein the communication session comprises a transmission control protocol (TCP) session, a domain name server (DNS) session, or a uniform datagram protocol (UDP) session.

10. The method of claim 8, wherein the first computing device comprises a policy decision point.

11. The method of claim 8, wherein determining that the destination host device is authorized to communicate with the source host device comprises:
receiving, from the first computing device, the authorization message, wherein the authorization message comprises a hash value; and
determining, based on the hash value being associated with the communication session, that the destination host device is authorized to communicate with the source host device.

12. The method of claim 8, wherein determining that the destination host device is authorized to communicate with the source host device comprises:
receiving, from the first computing device, the authorization message, wherein the authorization message comprises a sequence number; and
determining, based on the sequence number being associated with the communication session, that the destination host device is authorized to communicate with the source host device.

13. The method of claim 8, wherein determining that the destination host device is authorized to communicate with the source host device comprises:
sending, to a policy enforcement point, the authorization message, wherein the policy enforcement point determines, based on the authorization message, an access control list entry indicative of an authorization of the communication session,
receiving, from the policy enforcement point based on the access control list entry, an indication that the communication session is authorized; and
determining, based on the indication that the communication session is authorized, that the destination host device is authorized to communicate with the source host device.

14. The method of claim 8, wherein the first message comprises at least one of:
a synchronization message;
a message associated with a three-way handshake between the source host device and the destination host device; or
a sequence number associated with the communication session.

15. A system comprising:
a source host device configured to send a first message; and
a policy enforcement device configured to:
receive the first message, wherein the first message is associated with establishing a communication session between the source host device and a destination host device;
send, to a policy decision device, an access control request associated with the communication session;
determine, based on an authorization message associated with the policy decision device, that the destination host device is authorized to communicate with the source host device; and
send, based on the authorization message, and based on the destination host device being authorized to communicate with the source host device, the first message to the source host device, wherein the first message causes the communication session to be established.

16. The system of claim 15, wherein the communication session comprises a transmission control protocol (TCP) session, a domain name server (DNS) session, or a uniform datagram protocol (UDP) session.

17. The system of claim 15, wherein the policy enforcement device comprises a policy enforcement point, and wherein the policy decision device comprises a policy decision point.

18. The system of claim 15, wherein the policy enforcement device is further configured to:
receive, from the policy decision device, the authorization message, wherein the authorization message comprises a hash value; and
determine, based on the hash value being associated with the communication session, that the destination host device is authorized to communicate with the source host device.

19. The system of claim 15, wherein the policy enforcement device is further configured to:
receive, from the policy decision device, the authorization message, wherein the authorization message comprises a sequence number; and determine, based on the sequence number being associated with the communication session, that the destination host device is authorized to communicate with the source host device.

20. The system of claim 15, wherein the first message comprises at least one of:
- a synchronization message;
- a message associated with a three-way handshake between the source host device and the destination host device; or
- a sequence number associated with the communication session.

* * * * *